United States Patent
Duggan et al.

(10) Patent No.: US 12,099,764 B1
(45) Date of Patent: Sep. 24, 2024

(54) METHODS AND SYSTEMS FOR ENCODING INFORMATION ABOUT VARIABLE DATA PRINT FILES

(71) Applicant: Global Graphics Software Limited, Cambridge (GB)

(72) Inventors: Angus Duggan, Seattle, WA (US); Martin Bailey, Cambridgeshire (GB)

(73) Assignee: GLOBAL GRAPHICS SOFTWARE LIMITED, Cambridge (GB)

( * ) Notice: Subject to any disclaimer, the term of this patent is extended or adjusted under 35 U.S.C. 154(b) by 0 days.

(21) Appl. No.: 18/123,636

(22) Filed: Mar. 20, 2023

(51) Int. Cl.
*G06F 3/12* (2006.01)

(52) U.S. Cl.
CPC .......... *G06F 3/1244* (2013.01); *G06F 3/1243* (2013.01)

(58) Field of Classification Search
CPC .... G06F 3/1244; G06F 3/1243; G06F 3/1232; G06F 3/1261; G06F 3/1203; G06F 3/1211; G06F 3/1285; G06F 3/1226; G06F 3/1291; G06F 3/126
See application file for complete search history.

(56) References Cited

U.S. PATENT DOCUMENTS

| | | | | |
|---|---|---|---|---|
| 11,334,303 | B1 * | 5/2022 | Duggan | G06F 3/1205 |
| 2005/0162676 | A1 * | 7/2005 | Aoki | G06F 3/1246 |
| | | | | 358/1.18 |
| 2010/0060935 | A1 * | 3/2010 | Nakao | G06K 15/02 |
| | | | | 358/1.18 |
| 2011/0157637 | A1 * | 6/2011 | Kimura | G06K 15/1849 |
| | | | | 358/1.15 |
| 2012/0057198 | A1 * | 3/2012 | Yabe | H04N 1/4078 |
| | | | | 358/1.15 |

\* cited by examiner

*Primary Examiner* — Iriana Cruz
(74) *Attorney, Agent, or Firm* — Branch Partners PLLC; Bruce E. Black

(57) ABSTRACT

A method for preparing a variable data print file for printing includes receiving a variable data print file that includes at least one repeating portion and at least one repeat length embedded in at least one data structure in the variable data print file, each repeat length is associated with a different repeating portion of the variable data print file, wherein either a) the at least one repeat length is a plurality of repeat lengths with at least two of the repeat lengths being different in length or b) the variable data print file further includes at least one non-repeating portion; reading the at least one repeat length from the data structure in the variable data print file; and using the at least one repeat length to determine an order in which pages from the at least one repeating portion are submitted for processing in preparation for printing.

20 Claims, 3 Drawing Sheets

METHODS AND SYSTEMS FOR ENCODING INFORMATION ABOUT VARIABLE DATA PRINT FILES

FIELD

The present invention is directed to the area of document processing and printing. The present invention is also directed to methods and systems for processing and printing variable data print files including encoding repeat length information in the variable data print file.

BACKGROUND

The use of variable data in print jobs is growing rapidly across multiple sectors of the print industry, from transactional (credit card statements, phone bills, and the like) through direct mail, promotional items, signage, labels, packaging, and so on.

Variable data printing is used to produce series of printed products where each one of that series differs slightly from the others, for example, printing different names and addresses on an envelope or postcard. Variable data printing may also include more complex differences using some graphics that are the same on every page, some that are unique to a single instance (for example, for one recipient of a mail piece) and some that are selected from small sets, perhaps based on metadata about that recipient.

One example is a postcard mailed out by a car dealership to encourage past customers to upgrade to the latest model of a car that the customer bought several years ago. For example, the postcard can have a static background with encouraging text, a company logo, an image aligned with the brand philosophy, and a map showing where the dealership is. The postcard can also include single use data such as the name and address of the customer, and optionally additional information such as exactly when the customer bought the last car. The postcard can also include data that is common to a subset of the customers such as an image of this years' model of the car that the customer previously purchased, possibly even in a similar color to the customer's current car. There may also be a photograph, signature, or name of the salesman from whom the customer bought the previous car. Such images or data are selected from a small set of images for each usage, which may be, for example, only two or three for the salesman's image or signature, and maybe a dozen or so for the car image.

BRIEF SUMMARY

One embodiment is a method for preparing a variable data print file for printing. The method includes receiving a variable data print file, wherein the variable data print file includes at least one repeating portion and at least one repeat length embedded in at least one data structure in the variable data print file, wherein each of the at least one repeat length is associated with a different one of the at least one repeating portion of the variable data print file, wherein either a) the at least one repeat length is a plurality of repeat lengths with at least two of the repeat lengths being different in length or b) the variable data print file further includes at least one non-repeating portion; reading the at least one repeat length from the data structure in the variable data print file; and using the at least one repeat length to determine an order in which pages from the at least one repeating portion are submitted for processing in preparation for printing.

In at least some embodiments, the using includes using the at least one repeat length to determine which instance of at least two processor instances each page will be submitted to. In at least some embodiments, the at least one data structure includes a) a document-level Metadata stream using a custom namespace; b) a DPM dictionary within a DPart structure; c) an array of dictionaries in PDF object format including at least one value of at least one key in a Catalog dictionary; or d) a stream including at least one value of at least one key in a Catalog object. In at least some embodiments, the method further includes printing a variable data document using the variable data print file and the at least one repeat length.

In at least some embodiments, the method further includes reading and using, for each of the at least one repeating portion and, when present, at least one non-repeating portion of the variable data print file, a page range for that repeating portion or non-repeating portion. In at least some embodiments, the page range is represented as either a) a number of pages, b) a first page and a last page of the repeating portion or non-repeating portion, c) a number of pages and either a first page or a last page of the repeating portion or non-repeating portion, or d) when the at least one repeating portion is a plurality of repeating portions arranged consecutively, a first page or a last page of the repeating portion. In at least some embodiments, the data structure includes a first object for each of the at least one repeating portion, wherein the first object includes the repeat length and the page range for the repeating portion. In at least some embodiments, the variable data print file includes at least one non-repeating portion and the data structure includes a second object for each of the at least one non-repeating portion, wherein the second object includes the page range for the non-repeating portion.

Another embodiment is a system for using a variable data print file. The system includes at least one processor configured and arranged to perform actions, the actions including: receiving a variable data print file, wherein the variable data print file includes at least one repeating portion and at least one repeat length embedded in at least one data structure in the variable data print file, wherein each of the at least one repeat length is associated with a different one of the at least one repeating portion of the variable data print file, wherein either a) the at least one repeat length is a plurality of repeat lengths with at least two of the repeat lengths being different in length or b) the variable data print file further includes at least one non-repeating portion; reading the at least one repeat length from the data structure in the variable data print file; and using the at least one repeat length to determine an order in which pages from the at least one repeating portion are submitted for processing in preparation for printing.

In at least some embodiments, the using includes using the at least one repeat length to determine which instance of at least two processor instances each page will be submitted to. In at least some embodiments, the actions further include printing a variable data document using the variable data print file and the at least one repeat length.

In at least some embodiments, the actions further include reading and using, for each of the at least one repeating portion and, when present, at least one non-repeating portion of the variable data print file, a page range for that repeating portion or non-repeating portion. In at least some embodiments, the data structure includes a first object for each of the at least one repeating portion, wherein the first object includes the repeat length and the page range for the repeating portion.

A further embodiment is a non-transitory computer-readable medium having processor-executable instructions for using a variable data print file, the processor-executable instructions when installed onto a device enable the device to perform actions, the actions including receiving a variable data print file, wherein the variable data print file includes at least one repeating portion and at least one repeat length embedded in at least one data structure in the variable data print file, wherein each of the at least one repeat length is associated with a different one of the at least one repeating portion of the variable data print file, wherein either a) the at least one repeat length is a plurality of repeat lengths with at least two of the repeat lengths being different in length or b) the variable data print file further includes at least one non-repeating portion; reading the at least one repeat length from the data structure in the variable data print file; and using the at least one repeat length to determine an order in which pages from the at least one repeating portion are submitted for processing in preparation for printing.

In at least some embodiments, the using includes using the at least one repeat length to determine which instance of at least two processor instances each page will be submitted to. In at least some embodiments, the actions further include printing a variable data document using the variable data print file and the at least one repeat length.

In at least some embodiments, the actions further include reading and using, for each of the at least one non-repeating portion and, when present, at least one repeating portion of the variable data print file, a page range for that repeating portion or non-repeating portion. In at least some embodiments, the data structure includes a first object for each of the at least one repeating portion, wherein the first object includes the repeat length and the page range for the repeating portion. In at least some embodiments, the variable data print file includes at least one non-repeating portion and the data structure includes a second object for each of the at least one non-repeating portion, wherein the second object includes the page range for the non-repeating portion.

Yet another embodiment is a method for amending a variable data print file. The method includes receiving the variable data print file, wherein the variable data print file includes at least one repeating portion; receiving at least one repeat length, wherein each of the at least one repeat length is associated with a different one of the at least one repeating portion of the variable data print file, wherein either a) the at least one repeat length is a plurality of repeat lengths with at least two of the repeat lengths being different in length or b) the variable data print file further includes at least one non-repeating portion; and embedding the at least one repeat length in at least one data structure in the variable data print file.

In at least some embodiments, the method further includes receiving, for each of the at least one repeating portion and, when present, at least one non-repeating portion of the variable data print file, a page range for that repeating portion or non-repeating portion. In at least some embodiments, the method further includes embedding the page range of each of the at least one repeating portion and, when present, the at least one non-repeating portion in the at least one data structure. In at least some embodiments, the page range is represented as either a) a number of pages, b) a first page and a last page of the repeating portion or non-repeating portion, c) a number of pages and either a first page or a last page of the repeating portion or non-repeating portion, or d) when the at least one repeating portion is a plurality of repeating portions arranged consecutively, a first page or a last page of the repeating portion.

In at least some embodiments, the data structure includes a first object for each of the at least one repeating portion, wherein the first object includes the repeat length and the page range for the repeating portion. In at least some embodiments, the variable data print file includes at least one non-repeating portion and the data structure includes a second object for each of the at least one non-repeating portion, wherein the second object includes the page range for the non-repeating portion.

In at least some embodiments, the at least one data structure includes a) a document-level Metadata stream using a custom namespace; b) a DPM dictionary within a DPart structure; c) an array of dictionaries in PDF object format including at least one value of at least one key in a Catalog dictionary; or d) a stream including at least one value of at least one key in a Catalog object.

In at least some embodiments, the method further includes printing a variable data print file using the variable data print file and the at least one repeat length.

Another embodiment is a system for amending a variable data print file. The system includes at least one processor configured and arranged to perform actions. The actions include receiving the variable data print file, wherein the variable data print file includes at least one repeating portion; receiving at least one repeat length, wherein each of the at least one repeat length is associated with a different one of the at least one repeating portion of the variable data print file, wherein either a) the at least one repeat length is a plurality of repeat lengths with at least two of the repeat lengths being different in length or b) the variable data print file further includes at least one non-repeating portion; and embedding the at least one repeat length in at least one data structure in the variable data print file.

In at least some embodiments, the actions further include receiving, for each of the at least one repeating portion and, when present, at least one non-repeating portion of the variable data print file, a page range for that repeating portion or non-repeating portion. In at least some embodiments, the actions further include embedding the page range of each of the at least one repeating portion and, when present, the at least one non-repeating portion in the at least one data structure.

In at least some embodiments, actions further include the data structure includes a first object for each of the at least one repeating portion, wherein the first object includes the repeat length and the page range for the repeating portion. In at least some embodiments, the variable data print file includes at least one non-repeating portion and the data structure includes a second object for each of the at least one non-repeating portion, wherein the second object includes the page range for the non-repeating portion.

In at least some embodiments, the actions further include printing a variable data document using the variable data print file and the at least one repeat length.

A further embodiment is a non-transitory computer-readable medium having processor-executable instructions for amending a variable data print file, the processor-executable instructions when installed onto a device enable the device to perform actions. The actions include receiving the variable data print file, wherein the variable data print file includes at least one repeating portion; receiving at least one repeat length, wherein each of the at least one repeat length is associated with a different one of the at least one repeating portion of the variable data print file, wherein either a) the at least one repeat length is a plurality of repeat lengths with at least two of the repeat lengths being different in length or b) the variable data print file further includes at least one non-repeating portion; and embedding the at least one repeat length in at least one data structure in the variable data print file.

In at least some embodiments, the actions further include receiving, for each of the at least one repeating portion and, when present, at least one non-repeating portion of the variable data print file, a page range for that repeating portion or non-repeating portion. In at least some embodiments, the actions further include embedding the page range of each of the at least one repeating portion and, when present, the at least one non-repeating portion in the at least one data structure.

In at least some embodiments, the data structure includes a first object for each of the at least one repeating portion, wherein the first object includes the repeat length and the page range for the repeating portion. In at least some embodiments, the variable data print file includes at least one non-repeating portion and the data structure includes a second object for each of the at least one non-repeating portion, wherein the second object includes the page range for the non-repeating portion.

In at least some embodiments, the actions further include printing a variable data document using the variable data print file and the at least one repeat length.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of document processing and printing. The present invention is also directed to methods and systems for processing and printing variable data print files including encoding repeat length information in the variable data print file.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of processor and any suitable type of device that includes a processor.

Figure 1:
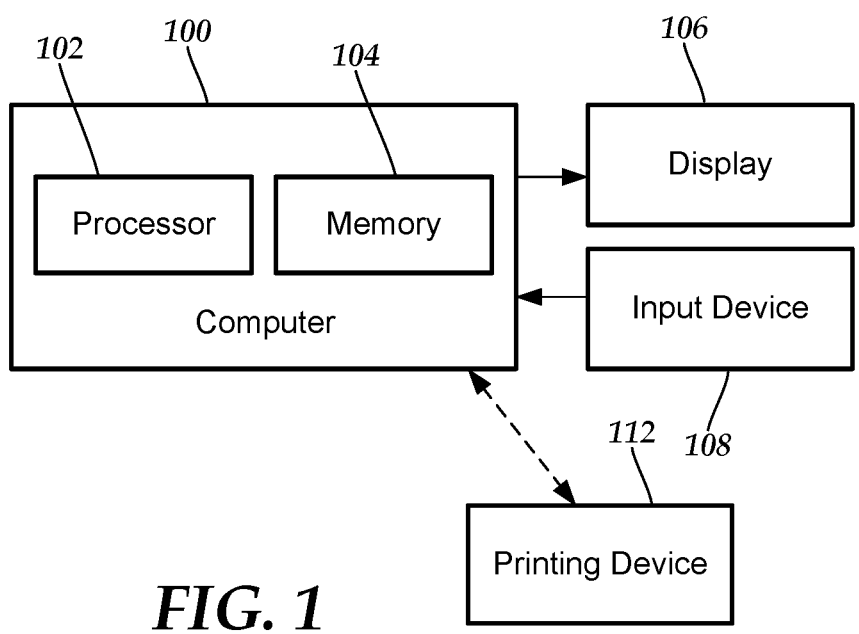
FIG. 1 is a schematic block diagram of one embodiment of a system for processing documents for printing, according to the invention.

FIG. 1 illustrates one embodiment of a system for practicing the invention. The system can include a computer 100 or any other device that includes a processor 102 and a memory 104, a display 106, an input device 108, and a printing device 112, such as a printer or press. The printing device 112 can be a digital press (for example, electrophotographic or inkjet presses), a conventional press (for example, (offset lithographic, flexographic, or gravure presses), an inkjet device, a laser printing device, or any other suitable printing device. Unless otherwise indicated, the terms "printing device" and "press" are used interchangeably herein. In some embodiments, one or more of the computer 100, display 106, or input device 108 can be part of the printing device 112.

The computer 100 can be a laptop computer, desktop computer, server computer, tablet, mobile device, smartphone, or other devices that can run applications or programs, or any other suitable device for processing information and for presenting a user interface. Alternatively or additionally, the computer 100 can be part of the printing device 112 or coupled (by wired or wireless coupling) to the printing device. The computer 100 can be local to the user or can include components that are non-local to the user including one or both of the processor 102 or memory 104 (or portions thereof). For example, in some embodiments, the user may operate a terminal that is connected to a non-local computer. In other embodiments, the memory can be non-local to the user.

The computer 100 can utilize any suitable processor 102 including one or more hardware processors that may be local to the user or non-local to the user or other components of the computer. The processor 102 is configured to execute instructions provided to the processor, as described below.

Any suitable memory 104 can be used for the computer 100. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

The display 106 can be any suitable display device, such as a monitor, screen, display, or the like. The input device 108 can be, for example, a keyboard, mouse, touch screen, track ball, joystick, voice recognition system, or any combination thereof, or the like and can be used by the user to interact with a user interface.

The size and complexity of variable data print (VDP) files or VDP jobs submitted to printing on digital or other presses continues to grow, as does the sophistication and efficiency of variable data processing in the Digital Front Ends (DFEs) or controllers for those presses. In some instances, the processing takes account of factors such as, for example, the total number of pages in a submitted file (such as a PDF file), the repeat length within the file, the number of Raster Image Processors (RIPs), or the like to increase the efficiency of processing. In this context "high efficiency processing" means reducing the amount of work to interpret, color manage, and render the pages by increasing the re-use of elements that are found multiple times within the job, while delivering the rasters for each page to the press in as close an order to that required for printing as possible. The combination of these two activities can reduce the hardware used for buffering rasters between RIP and press (thereby saving costs) while reducing the need to slow the press because pages are not being delivered as fast as the speed of the press engine. PDF files will be used as examples herein, but it will be recognized that the methods and systems described herein can be used to process any other printable files.

The 'repeat length' within a variable data print file is the number of pages that are repeated one or more times because those pages share a significant amount of re-used artwork or the like. When printing labels or cartons the repeat length is often one page because every page in the submitted file contains layouts using the same set of graphics with the addition of some single-use data such as serial numbers, unique barcodes, competition entries, or the like. For a direct mail postcard job, the repeat length will often be two because each odd-numbered page is the front of the postcard and each even-numbered page is the back of the postcard. For other VDP jobs, the repeat length can be the number of pages that are sent to each recipient of that piece (although this may be affected by how the jobs are imposed for printing). Thus, the repeat length for a personalized booklet with eight pages for each recipient is eight.

Re-use of graphical elements often means submitting the Nth page of each repeat length is submitted to the same RIP within the DFE because graphics are most commonly re-used in the same page within the sequence for each recipient. Examples of methods and system for VDP document printing that can be modified to include the systems and methods described herein is found in U.S. Pat. No. 11,334,303, incorporated herein by reference in its entirety.

There are some VDP jobs where the repeat length varies between recipients. One example is some financial reports which can vary in the number of pages for each recipient. It can be difficult to enhance or improve the submission of such documents across multiple RIPs when such VDP jobs are graphically rich.

For VDP files that have a constant repeat length, conventional methods and systems can explicitly identify the pages to be printed for each printed product in the series using a Document Part (DPart) structure (for example, see, PDF 2.0 as ISO 32000-2), which also can be used for variable length jobs. Checking that the file does have a constant repeat length or obtaining the repeat length from the file may include reading the entire DPart tree and the entire Pages tree in the PDF file. The DPart entries include pointers to Page objects within the PDF file, not to page indices, so that pointer must be followed through the Pages tree to determine the page index before comparing the indices of the start and end page of each page range. For large VDP files, which may contain multiple millions of pages, this can be inefficient and add considerable processing time before printing can start.

Moreover, many VDP and other print files are constructed from multiple sub-jobs concatenated end-to-end. One example is a file printed using an ultra-high-speed inkjet press, which may be printing faster than the equivalent of 10,000 A4 or US Letter pages per minute onto a reel of paper. Those paper reels are very large and very heavy and printing speed cannot be varied quickly. Conventionally, a composite PDF file that will fill a single paper reel is generated from multiple original PDF files to print the entire paper reel, where each of the original PDF files becomes a sub-job in the composite PDF file. However, when a PDF file contains multiple VDP sub-jobs, each of those VDP sub-jobs can have a different repeat length. A DFE configured for the repeat length of the first VDP sub-job in the file may perform sub-optimally for the other VDP sub-jobs.

Another example is a PDF file that contain some number of leader pages before, or trailer pages after, (or both) VDP sub-job pages. For example, the leader or trailer pages can carry registration patterns to ensure that the different ink colors on the press are in register with each other or that the press is in register with finishing equipment such as cutters. In some cases, the leader or trailer pages are intended to exercise the inkjet heads, or to print test patterns to check that the press is clean and healthy.

Systems and methods are described herein that provide for the recording of repeat length(s) in a structure in a VDP file. This structure can record repeat lengths (which may be different from each other) associated with different VDP sub-jobs or different ranges of pages in the VDP file. In at least some embodiments, these systems and methods can simplify page submission planning both for VDP files containing a single job with a constant repeat length and for VDP files containing multiple sub-jobs with each sub-job having its own constant repeat length.

Figure 2:
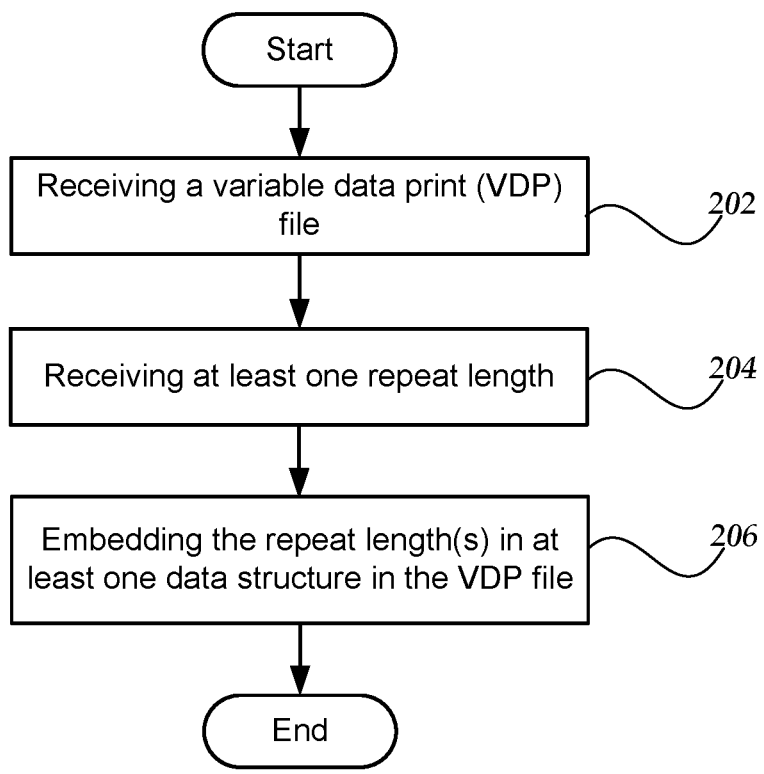
FIG. 2 is a schematic flowchart of one embodiment of a method for amending a variable data print file, according to the invention.

FIG. 2 is a flowchart of one embodiment of a method for amending a variable data print (VDP) file. In step 202, the VDP file is received. The VDP file has at least one repeating portion (for example, at least one VDP sub-job). The VDP file can be received from any source, including creation of the VDP file on the processor that is used for one, or both of, steps 204 and 206 below.

In step 204, at least one repeat length is received for the VDP file. In at least some embodiments, the VDP file including at least one non-repeating portion, such as a leading or trailing sections, as described above. In at least some embodiments, each repeat length is associated with a different one of at least one repeating portion (for example, VDP sub-job(s)) of the variable data print file. In at least some embodiments, multiple repeat lengths are received and are individually associated with different ones of the multiple repeating portions of the VDP file. In at least some of those embodiments, at least two of the repeat lengths are different in length.

In step 206, the repeat length(s) are embedded or otherwise included in at least one data structure in the VDP file before it is submitted to the DFE to be processed for printing. In at least some embodiments, the inclusion of the repeat length(s) in the VDP file can be performed by a composition engine as the VDP file (e.g., a PDF file) is created. In at least some other embodiments, the inclusion of the repeat length(s) in the VDP file can be performed by a writing system either before submission to the press DFE or can be performed by the DFE as a relatively early step in the workflow within that DFE.

In at least some embodiments, the DFE can read the repeat length(s) and determine one or more of the following: if there are more than one sub-job in the VDP file, the range of pages within the VDP file that constitute the repeating portion or each sub-job, or the repeat length for the repeating portion or for each of the sub-jobs.

One example of a suitable data structure for a VDP file is as follows:

```
[
    {
        "FirstPage" = 1,
        "LastPage" = 600,
        "Variable" = false
    },
    {
        "FirstPage" = 601,
        "LastPage" = 20600,
        "Variable" = true,
        "RepeatLength" = 4
    }
]
```

This example is provided in JSON notation, but any other suitable language or grammar can be used. The property names are also examples and any other suitable property names can be used. In at least some embodiments, a common approach to language, grammar, property names, and location of embedding in the file can be identified or used. The example above is for a file containing a single 20000 page VDP sub-job with 600 non-variable leader pages at the front of the VDP file.

In at least some embodiments, the data structure is an array of objects. Each object represents a single repeating portion, such as a sub-job, or other portion within the file. Each object identifies a range of pages, within the file, corresponding to the repeating portion (or other portion), such as a sub-job or the repeat portion of the sub-job. For example, the range of pages can be identified by designating a first page and a last page or by designating a first page or last page and a number of pages in the repeating portion (or other portion). In at least some embodiments, the object can identify only a first page or last page for each repeating portion assuming that the series of repeating portions covers, in the same order as the objects in the array, either 1) all of the pages or 2) at least all of the pages either a) starting with the designated first page of the first object until the end of the file or b) starting at the beginning of the file and ending with the designated last page of the last object within the file (for example, a PDF/VT file conforming to ISO 16612-2 or ISO 16612-3).

In at least some embodiments, the data structure includes a flag or other element for each object to indicate whether that object contains variable data or not. In the example presented above, 'Variable' indicates whether the portion of the VDP file includes variable data (true) or not (false).

In at least some embodiments, each object for a variable data repeating portion can include a value for the repeat length of the repeating portion. For example, as illustrated in the example above, the second object is 20,000 pages long with a repeat length of 4 pages—meaning that the common elements are repeated 5,000 times. In at least some embodiments, a VDP sub-job may not have a consistent repeat length. In at least some embodiments, the data structure may capture that situation, for example by using a value of 0 (zero) for the repeat length.

PDF is a flexible format and the data structure described above can be embedded in multiple different locations within a PDF file using any one of multiple different languages (for example, XML, JSON, XMP, PDF objects, or the like). For example, the data structure can be provided a) in XMP within a document-level Metadata stream and using a custom namespace; b) in a DPM dictionary within a DPart structure at a level of that structure that represents the page ranges for each of the sub-jobs (but using page indices alongside the page references for rapid extraction of data); c) as an array of dictionaries in PDF object format as the value of a key in a Catalog dictionary; d) as a stream in XML as the value of a key in a Catalog object; e) as a stream in a custom format as the value of a key in a Catalog object; or f) as a stream in JSON as the value of a key in a Catalog object. An incremental update can be used to add this data after the variable data print file has been created, preferably, with little or no disruption to existing data structures. Any other suitable data structure and placement in the file can be used.

In at least some embodiments, an extensible file format is used so that additional data can be associated with each repeating portion (or other portion) within the file. As an example, in at least some embodiments, the object for each repeating portion (or other portion) within the file has an identifier associated with the object. This can facilitate an operator requesting that just a subset of the repeating portions (or other portions) in the file are printed.

Figure 3:
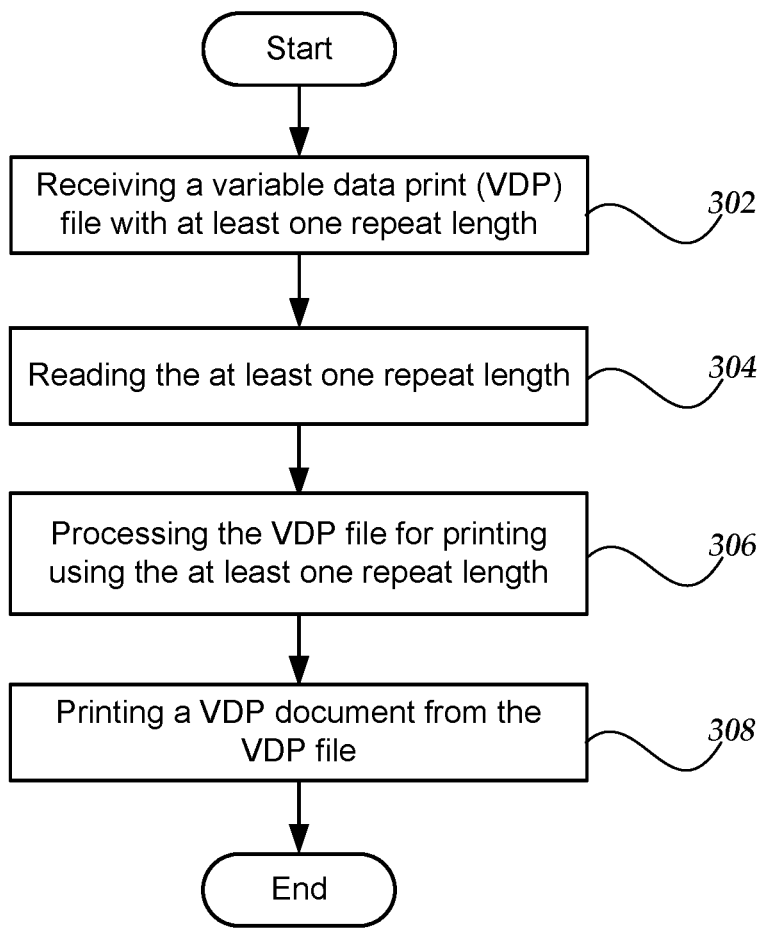
FIG. 3 is a schematic flowchart of one embodiment of a method for using a variable data print file.

FIG. 3 illustrates one embodiment of a method for using a variable data print file. In step 302, a variable data print file is received. The variable data print file includes at least one repeating portion and at least one repeat length embedded in at least one data structure in the variable data print file. In at least some embodiments, each of repeat length is associated with a different repeating portion of the variable data print file. In at least some embodiments, the variable data print file has multiple repeating portions and multiple repeat lengths with at least two of the repeat lengths being different in length. In at least some embodiments, the variable data print file also includes at least one non-repeating portion. Examples of the variable data print files and the embedded repeat lengths and other information are discussed above.

In step 304, the repeat length(s) from the data structure are read. In step 306, the variable data print file is processed by the DFE or other processor into rasters or the like for printing. The DFE or other processor uses that repeat length(s) to determine an order in which pages from repeating portion(s) are submitted for processing in preparation for printing. In at least some embodiments, this order reduces or minimizes the risk that the DFE will fail to deliver raster data for each page to the press in time for it to be printed without slowing or stopping the press. In at least some embodiments, the processing is organized in such a way that the processing reduces or minimizes the hardware (for example, the RAM) used to ensure that the DFE can deliver rasters to the press at an adequate speed. In at least some embodiments, in a DFE that includes multiple instances of a process, such as a Raster Image Processor (RIP), that will each work on pages in parallel, the embedded page ranges or repeat lengths may additionally be used to calculate or determine a strategy for deciding which of those processes each page should be submitted to. U.S. Pat. No. 11,334,303, incorporated herein by reference in its entirety, provides non-limiting examples of processing including methods and systems that determine in the order in which pages from a file are submitted for processing.

In step 308, a variable data document is printed from the variable data print file using the repeat length(s) embedded in the variable data print file.

In at least some embodiments, the methods and systems described herein can facilitate the processing of a VDP file within the DFE for a digital press whether or not the VDP file contains multiple repeating portions (for example, sub-jobs) with different repeat lengths. In at least some embodiments, provision of the data structure can reduce the start-up cost for the processing because the DFE does not need to examine a VDP file in as much detail as would otherwise be required. In at least some embodiments, including the data structure within a VDP file may reduce any risk of the data structure becoming dissociated from the VDP file. In at least some embodiments, the systems and methods described herein can reduce the risk of needing to slow the press because the DFE cannot deliver raster data fast enough or of failing to deliver raster data when needed and starving the press.

The methods and systems described herein may be embodied in many different forms and should not be construed as limited to the embodiments set forth herein. Accordingly, the methods and systems described herein may take the form of an entirely hardware embodiment, an entirely software embodiment or an embodiment combining software and hardware aspects. Systems referenced herein typically include memory and typically include methods for communication with other devices including mobile devices. Methods of communication can include both wired and wireless (e.g., RF, optical, or infrared) communications methods and such methods provide another type of computer readable media; namely communication media. Wired communication can include communication over a twisted pair, coaxial cable, fiber optics, wave guides, or the like, or any combination thereof. Wireless communication can include RF, infrared, acoustic, near field communication, Bluetooth™, or the like, or any combination thereof.

It will be understood that each block of the flowchart illustrations, and combinations of blocks in the flowchart illustrations and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A method for preparing a variable data print file for printing, the method comprising:
   receiving a variable data print file, wherein the variable data print file comprises at least one repeating portion and at least one repeat length embedded in at least one data structure in the variable data print file, wherein each of the at least one repeat length is associated with a different one of the at least one repeating portion of the variable data print file, wherein either a) the at least one repeat length is a plurality of repeat lengths with at least two of the repeat lengths being different in length or b) the variable data print file further comprises at least one non-repeating portion;
   reading the at least one repeat length from the at least one data structure in the variable data print file; and
   using the at least one repeat length to determine an order in which pages from the at least one repeating portion are submitted for processing in preparation for printing.

2. The method of claim 1, wherein the using comprises using the at least one repeat length to determine which instance of at least two processor instances each page will be submitted to.

3. The method of claim 1, further comprising reading and using, for each of the at least one repeating portion and, when present, at least one non-repeating portion of the variable data print file, a page range for that repeating portion or non-repeating portion.

4. The method of claim 3, wherein the page range is represented as either a) a number of pages, b) a first page and a last page of the repeating portion or non-repeating portion, c) a number of pages and either a first page or a last page of the repeating portion or non-repeating portion, or d) when the at least one repeating portion is a plurality of repeating portions arranged consecutively, a first page or a last page of the repeating portion.

5. The method of claim 3, wherein the at least one data structure comprises a first object for each of the at least one repeating portion, wherein the first object comprises the repeat length and the page range for the repeating portion.

6. The method of claim 5, wherein the variable data print file comprises at least one non-repeating portion and the at least one data structure comprises a second object for each of the at least one non-repeating portion, wherein the second object comprises the page range for the non-repeating portion.

7. The method of claim 1, wherein the at least one data structure comprises a) a document-level Metadata stream using a custom namespace; b) a DPM dictionary within a DPart structure; c) an array of dictionaries in PDF object format comprising at least one value of at least one key in a Catalog dictionary; or d) a stream comprising at least one value of at least one key in a Catalog object.

8. The method of claim 1, further comprising printing a variable data document using the variable data print file and the at least one repeat length.

9. A method for amending a variable data print file, the method comprising:
   receiving the variable data print file, wherein the variable data print file comprises at least one repeating portion;
   receiving at least one repeat length, wherein each of the at least one repeat length is a number indicating the number of pages of a different one of the at least one repeating portion of the variable data print file, wherein either a) the at least one repeat length is a plurality of repeat lengths with at least two of the repeat lengths being different in length or b) the variable data print file further comprises at least one non-repeating portion; and embedding the at least one repeat length in at least one data structure in the variable data print file.

10. A system for using a variable data print file, the system comprising:

at least one processor configured and arranged to perform actions, the actions comprising:

receiving a variable data print file, wherein the variable data print file comprises at least one repeating portion and at least one repeat length embedded in at least one data structure in the variable data print file, wherein each of the at least one repeat length is associated with a different one of the at least one repeating portion of the variable data print file, wherein either a) the at least one repeat length is a plurality of repeat lengths with at least two of the repeat lengths being different in length or b) the variable data print file further comprises at least one non-repeating portion;

reading the at least one repeat length from the at least one data structure in the variable data print file; and using the at least one repeat length to determine an order in which pages from the at least one repeating portion are submitted for processing in preparation for printing.

11. The system of claim 10, wherein the using comprises using the at least one repeat length to determine which instance of at least two processor instances each page will be submitted to.

12. The system of claim 10, wherein the actions further comprise reading and using, for each of the at least one repeating portion and, when present, at least one non-repeating portion of the variable data print file, a page range for that repeating portion or non-repeating portion.

13. The system of claim 12, wherein the at least one data structure comprises a first object for each of the at least one repeating portion, wherein the first object comprises the repeat length and the page range for the repeating portion.

14. The system of claim 10, wherein the actions further comprise printing a variable data document using the variable data print file and the at least one repeat length.

15. A non-transitory computer-readable medium having processor-executable instructions for using a variable data print file, the processor-executable instructions when installed onto a device enable the device to perform actions, the actions comprising the method of claim 1.

16. The non-transitory computer-readable medium of claim 15, wherein the using comprises using the at least one repeat length to determine which instance of at least two processor instances each page will be submitted to.

17. The non-transitory computer-readable medium of claim 15, wherein the actions further comprise reading and using, for each of the at least one non-repeating portion and, when present, at least one repeating portion of the variable data print file, a page range for that repeating portion or non-repeating portion.

18. The non-transitory computer-readable medium of claim 17, wherein the at least one data structure comprises a first object for each of the at least one repeating portion, wherein the first object comprises the repeat length and the page range for the repeating portion.

19. The non-transitory computer-readable medium of claim 18, wherein the variable data print file comprises at least one non-repeating portion and the at least one data structure comprises a second object for each of the at least one non-repeating portion, wherein the second object comprises the page range for the non-repeating portion.

20. The non-transitory computer-readable medium of claim 15, wherein the actions further comprise printing a variable data document using the variable data print file and the at least one repeat length.

* * * * *